Patented Sept. 4, 1934

1,972,459

UNITED STATES PATENT OFFICE 1,972,459

REESTERIFICATION OF NATURAL WAXES AND THE PRODUCT THEREOF

Wilhelm Pungs, Ludwigshafen-on-the-Rhine, and Helmuth Freytag, Mannheim, Germany, assignors to I. G. Farbenindustrie Aktiengesellschaft, Frankfort-on-the-Main, Germany No Drawing. Application July 25, 1931, Serial No. 553,214. In Germany August 1, 1930

10 Claims. (Cl. 87—19)

The present invention relates to the production of wax-like substances, i. e. of substances having the appearance and usually the physical properties of waxes of natural origin.

A process for the production of wax-like substances has been described by one of the present inventors and another in the application Ser. No. 516,206, filed February 16, 1931, according to which the wax-like substances are obtained by subjecting waxes to a splitting into acids and alcohols, the acids being converted into other compounds if desired.

We have now found that wax-like substances containing alcohols of high molecular weight in the free state are obtained in a simple manner by re-esterifying the waxes of natural origin, i. e. esters of organic acids of high molecular weight with alcohols of high molecular weight with any mono- or polyhydric alcohols other than those originally contained in the waxes, preferably with those which contain fewer carbon atoms in the molecule than the alcohols present in the waxes. The term "reesterification" or "reesterifying" is intended to mean that substantially the whole of the original ester has been converted into a new ester and that substantially the whole of the alcohol of the original ester is in a free state. For this purpose, the wax esters are heated to elevated temperatures above 100° C., say from 120 to 160° C., with the alcohols desired, if desired in the presence of catalysts and/or in a closed vessel. The catalysts suitable for the said re-esterification may be chosen from the usual acid esterification catalysts such as concentrated sulphuric or hydrochloric acids or acid salts as for example sodium bisulphate. By working in a closed vessel a pressure above atmospheric pressure is generated therein, this feature being usually employed on working with alcohols boiling below 160° C., and especially with alcohols boiling below 100° C. The alcohols may be chosen from aliphatic open chain or cyclic mono- or polyhydric alcohols and aliphatic-aromatic alcohols as for example methyl, ethyl, propyl, iso-butyl, amyl, hexyl, cyclohexyl or benzyl alcohols, glycols as for example ethylene, 1.2- or 1.3-propylene or 1.2- or 1.3- or 1.4-butylene glycols, glycerol, hydroxyl bearing ethers of polyhydric alcohols as for example alkyl ethers of glycols or of glycerol such as mono-methyl, -ethyl or -propyl ethers of ethylene glycol or of the aforesaid other glycols or mono- or di-alkyl ethers of glycerol.

The mixtures obtained in this way and which contain alcohols of high molecular weight on the one hand and esters of the acids contained in the initial product with the added alcohols on the other hand are much harder than products, obtained by an esterification of the free carboxylic acids only of waxes of natural origin without re-esterification of the esters contained in the said waxes, and are much more easily homogenized with turpentine or mineral oils than the said neutralized waxes and are capable of being homogenized with much larger quantities of the said solvents than the said neutralized waxes. The re-esterification is easily ascertained not only by the reduction of the acid but also, and more markedly, by the increase of the hydroxyl value of the final product after removal of remainders of the alcohol employed for the re-esterification. The mixtures obtained according to the present invention may be employed as such for any purposes of the different branches of the industries which work up waxes, such as for boot, furniture or floor polishes or may be further converted after separation of the components, the components, that is the alcohols of high molecular weight and the esters, singly or in admixture with each other or with other substances such as paraffin wax or carnauba wax, being subjected to reactions corresponding to their chemical nature the alcohols being etherified for example with alcohols or esterified with organic acids different from those of the original waxes. The new esters may be wholly or partially saponified, for example with alkali metal or alkaline earth metal, and the acids subsequently set free from the soaps may be further converted into acid derivatives such as amides or acid halides. The products of the saponification are in most cases different from those of a saponification of the original waxes, an etherification of hydroxyl groups and a splitting of lactone groups occurring apparently during the re-esterification.

The new esters, or mixtures containing the same may be subjected to a bleaching by chemical or physical methods as for example by means of chromic acid or active charcoal during or after the esterification or further working up, and may be mixed with other wax-like or oily substances, such as fats, oils, resins, hydrocarbon waxes and paraffin oil before, during or after the bleaching. The products are eminently suitable for employment in the industries employing waxes, in the textile and leather industries and for the manufacture of boot, furniture or floor polishes, carbon papers, polishing stains or leather grease or polish.

The following examples will further illustrate the nature of this invention but the invention is not restricted to these examples.

Example 1

1.5 kilograms of crude Montan wax are slowly heated while shaking, to 120° C. with 3.75 kilograms of anhydrous ethyl alcohol to which 75 grams of concentrated sulphuric acid have been added in an autoclave lined with lead, and then allowed to cool slowly while shaking. The esterification is completed in about 6 hours. After neutralizing the sulphuric acid with alkali, the remainders of ethyl alcohol are evaporated and the liquid waxy material is decanted from the precipitated crystals of alkali metal sulphate. The acid value of the crude Montan wax has fallen from 40 to 6 while the hydroxyl value has risen from 30 to 58. The product is eminently suitable as a polishing wax in the preparation of polishing agents and like preparations.

For the production of a base for dark coloured aqueous shoe creams, 212 parts of the product are heated for about 3 hours to about 110° C. together with 100 parts of stearic acid. The acid value of the product is about 51 and its softening point is about 85° C.

Example 2

6 kilograms of carnauba wax are stirred for 6 hours at 140° C. with 15 kilograms of 1.2-propylene glycol to which 300 grams of concentrated sulphuric acid have been added. After neutralizing the sulphuric acid with alkali the remainders of propylene glycol are expelled with steam at about 20 millimetres and the liquid wax is decanted from the sulphate crystals. The acid value of the wax is decreased from 7 to 3 and the hydroxyl value is raised from 10 to 50. A wax is obtained which for example when employed for shoe creams imparts to leather an excellent shiny surface, such black cream consisting for example of 4 parts of the aforesaid product, 8 parts of crude Montan wax, 12 parts of paraffin wax, 3 parts of soluble nigrosine base and 85 parts of turpentine oil.

Example 3

200 parts of deresinified crude Montan wax are stirred for 7 hours at 120° C. in a stirring autoclave with 500 parts of methyl alcohol and 2 parts of concentrated sulphuric acid. The product is then worked up as described in Example 1 and possesses an acid value of 4 in comparison to 36 of the initial wax and a hydroxyl value of 63 in comparison to 38 of the initial wax.

Example 4

500 parts of crude Montan wax are stirred in an open vessel for 10 hours at 140° C. together with 200 parts of a commercial 1.3-butylene glycol having a boiling point of 206° C. and with 10 parts of an aqueous 50 per cent sulphuric acid solution. The sulphuric acid is then neutralized by adding an equivalent amount of an alcoholic solution of potassium hydroxide and the remainders of butylene glycol are evaporated in vacuo while gradually raising the temperature to 160° C.

During the reaction the acid value decreases from 35 to 9 and the hydroxyl value rises from 49 to 76.

Example 5

200 parts of deresinified crude Montan wax are slowly heated to from 120° to 130° C. together with 500 parts of ethylene glycol and 8 parts of concentrated sulphuric acid. After 7 hours the mixture is allowed to cool, rendered neutral with a quantity of aqueous caustic potash solution equivalent to the quantity of sulphuric acid employed, the remainders of ethylene glycol are distilled off in vacuo and the fused wax-like product is filtered off from crystals of potassium sulphate. The acid value of the product is 3 in comparison to 39 of the original wax and the hydroxyl value is 79 in comparison to 31 of the original wax. 100 parts of the product are stirred with 2 parts of calcium hydroxide for 2 hours at from 115° to 125° C. A product is obtained which is easily homogenized with large quantities of turpentine oil; polishing preparations from the said product give a very high gloss on leather.

What we claim is:—

1. The process for the production of wax-like substances which comprises re-esterifying a wax of natural origin, containing esters from carboxylic acids and alcohols of high molecular weight with an alcohol different from, and having a lower molecular weight than, those present in said esters by heating at a temperature above 100° C. up to about 160° C. until substantially the whole of the original ester is converted into a new ester with the said alcohol having a lower molecular weight and substantially the whole of the alcohol of high molecular weight is present in a free state.

2. The process for the production of wax-like substances which comprises re-esterifying a wax of natural origin, containing esters from carboxylic acids and alcohols of high molecular weight with an aliphatic alcohol different from, and having a lower molecular weight than, those present in said esters by heating at a temperature above 100° C. up to about 160° C. until substantially the whole of the original ester is converted into a new ester with the said alcohol having a lower molecular weight and substantially the whole of the alcohol of high molecular weight is present in a free state.

3. The process for the production of wax-like substances which comprises re-esterifying a wax of natural origin, containing esters from carboxylic acids and alcohols of high molecular weight with an aliphatic monohydric alcohol different from, and having a lower molecular weight than, those present in said esters by heating at a temperature above 100° C. up to about 160° C. until substantially the whole of the original ester is converted into a new ester with the said alcohol having a lower molecular weight and substantially the whole of the alcohol of high molecular weight is present in a free state.

4. The process for the production of wax-like substances which comprises re-esterifying a wax of natural origin, containing esters from carboxylic acids and alcohols of high molecular weight with an aliphatic polyhydric alcohol different from, and having a lower molecular weight than, those present in said esters by heating at a temperature above 100° C. up to about 160° C. until substantially the whole of the original ester is converted into a new ester with the said alcohol having a lower molecular weight and substantially the whole of the alcohol of high molecular weight is present in a free state.

5. As new articles of manufacture mixtures comprising wax-like substances in which the carboxylic acids of a wax of natural origin are esterified with an alcohol, different from, and having a lower molecular weight than, those to which said carboxylic acids are connected in said wax of natural origin, and the said last-mentioned alcohols in the free state.

6. As new articles of manufacture mixtures comprising wax-like substances in which the carboxylic acids of Montan wax are esterified with an alcohol, different from, and having a lower molecular weight than, those to which said carboxylic acids are connected in said Montan wax, and the said last-mentioned alcohols in the free state.

7. As new articles of manufacture mixtures comprising wax-like substances in which the carboxylic acids of Montan wax are esterified with an aliphatic alcohol, different from, and having a lower molecular weight than, those to which said carboxylic acids are connected in said Montan wax, and the said last-mentioned alcohols in the free state.

8. As new articles of manufacture mixtures comprising wax-like substances in which the carboxylic acids of Montan wax are esterified with ethyl alcohol, and the alcohols, in the free state, to which said carboxylic acids are connected in Montan wax.

9. As new articles of manufacture mixtures comprising wax-like substances in which the carboxylic acids of Montan wax are esterified with a glycol and the alcohols, in the free state, to which said carboxylic acids are connected in Montan wax.

10. As new articles of manufacture mixtures comprising wax-like substances in which the carboxylic acids of Montan wax are partially esterified with ethyl alcohol and partially saponified with calcium, and the alcohols, in the free state, to which said carboxylic acids are connected in Montan wax.

WILHELM PUNGS.
HELMUTH FREYTAG.